United States Patent
Hauser

[11] Patent Number: 6,063,242
[45] Date of Patent: May 16, 2000

[54] EVAPORATION SYSTEM

[75] Inventor: Erwin Hauser, Emmendingen, Germany

[73] Assignee: KNF Neuberger GmbH, Freiburg, Germany

[21] Appl. No.: 09/143,677

[22] Filed: Aug. 31, 1998

[30] Foreign Application Priority Data

Aug. 29, 1997 [DE] Germany .................. 197 37 717

[51] Int. Cl.[7] ................ B01D 3/10; B01D 3/00; B01D 3/08; B01D 3/42; B01L 11/00

[52] U.S. Cl. ............... 202/205; 202/83; 202/160; 202/185.1; 202/238; 203/2; 203/87; 203/DIG. 2; 422/101

[58] Field of Search ................ 203/2, 87, 91, 203/DIG. 2, DIG. 14; 202/83, 160, 186, 185.1, 205, 238; 422/101, 130; 159/44

[56] References Cited

U.S. PATENT DOCUMENTS

| | | | |
|---|---|---|---|
| 4,554,055 | 11/1985 | Rooney | 203/89 |
| 4,759,825 | 7/1988 | Medvey et al. | 202/181 |
| 5,340,444 | 8/1994 | van der Heijden | 202/186 |
| 5,411,707 | 5/1995 | Hiatt | 422/68.1 |

FOREIGN PATENT DOCUMENTS

| | | |
|---|---|---|
| 0 219 450 A1 | 4/1987 | European Pat. Off. . |
| 0 783 910 A1 | 7/1997 | European Pat. Off. . |
| 37 18791 A1 | 12/1987 | Germany . |
| 297 15 507 U1 | 12/1997 | Germany . |
| 196 27 641 C1 | 1/1998 | Germany . |

*Primary Examiner*—Jill Warden
*Assistant Examiner*—Dwayne K. Handy
*Attorney, Agent, or Firm*—Akin, Gump, Strauss, Hauer & Feld, L.L.P.

[57] ABSTRACT

An evaporation system for separation of a fluid mixture into its component parts, especially for the reclamation of solvents, has a vacuum pump connected to the evaporator, especially a rotation evaporator, with at least one separator being connected to the suction side of the vacuum pump and at least one secondary condenser being connected at the pressure side of the vacuum pump. A fine regulating valve (8) is installed in the connecting pipe (7) between the rotation evaporator (2) and the separator (9), which is connected in front of the vacuum pump (10), for regulation of the boiling pressure.

5 Claims, 1 Drawing Sheet

EVAPORATION SYSTEM

BACKGROUND OF THE INVENTION

The invention relates to an evaporation system for separating a fluid mixture into its component parts, especially for the purpose of solvent reclamation, wherein a vacuum pump is connected to an evaporator, especially a rotation evaporator, and also at least one solvent separator on the suction side of the vacuum pump and at least one secondary condenser on the pressure side of the vacuum pump are attached.

Solvents are often used as adjuvant substances in chemical laboratories and, for example, are required for the synthesis of new substances. In the past, the reclamation of solvents has been considered a minor issue. As a result of the change in environmental consciousness with regard to emissions, and also the increased awareness of danger and cost to the user, re-orientation of this viewpoint has only occurred over the last few years. Hence, vacuum systems for the reclamation of solvents have been developed in the past few years which are geared towards the optimization of these three points.

In order to be able to reclaim the solvent, it is already known, for example, to heat the solvent in a rotation evaporator over a water bed. For evaporation of the solvent, pressure and temperature must be coordinated with one another, since every solvent has a boiling pressure at a certain temperature at which it evaporates. The boiling pressure in the rotation evaporator is generated by the vacuum pump. Initially, when commencing evaporation of the solvent, the glass flask of the rotation evaporator is at atmospheric pressure. Then, the vacuum pump also evacuates the boiling pressure which results from the respective bath temperature. When this pressure is reached, the solvent begins to evaporate from the original fluid mixture. The boiling pressure should then be kept constant.

It is already known to provide a fine regulating valve with foreign gas feeding for this purpose. Upon reaching the boiling pressure, the fine regulating valve is opened far enough for the boiling pressure to be kept constant by the influx of foreign gas, generally air. Later in the process, the vaporous solvent is to condense on the cooling coil in the rotary evaporator, drain off and be collected in the evaporator's round flask. However, a part of the vapor escapes from the rotary evaporator through the vacuum pump, and then condenses under atmospheric pressure in a water-cooled secondary condenser.

With these known systems, the following problems have resulted in practice:

In the case of solvents with a low boiling point, the utilized vacuum pumps have too great a suction capacity, meaning that a correspondingly high gas speed results. This presents the danger of a large quantity of the solvent being pulled along still in a fluid state, whereupon it would not be able to condense in the rotary evaporator. The high gas speeds also occur in the secondary condenser, where they also prevent efficient condensation, so that the solvent vapor can also escape out into the surrounding air.

Another disadvantage is that the solvent condensing in the round flask of the secondary condenser cannot be reused, as it is contaminated, for example by the plasticizers in the connecting pipes. This part of the reclaimed solvent must therefore be discarded.

It is also already known to dispose an electromechanical vacuum valve, controlled by a vacuum controller, in the connecting pipe between the rotation evaporator and the membrane pump. The pressure in the rotation evaporator is measured via the vacuum controller, and the vacuum valve is closed when boiling pressure is reached. The vacuum pump evacuates the connection pipe between the vacuum valve and the pump to the final pressure of the pump. The vacuum valve must be opened from time to time, so that the pump can again evacuate to the boiling pressure of the solvent which is to be evaporated. A rapid pressure increase or pressure equalization in the connection pipe to the rotation evaporator results from the sudden opening of the vacuum valve. As a result, the pressure in the connection pipe to the pump also increases, and with the pressure, also the suction capacity of the pump. Likewise, the flow speed throughout the system increases in proportion to the suction capacity. The aforementioned disadvantages result from this. Furthermore, a vacuum controller and the vacuum valve are expensive, meaning that the system as a whole is expensive to purchase.

SUMMARY OF THE INVENTION

An object of the present invention is principally to provide an evaporation system for the separation of a fluid mixture into its component parts, especially for the reclamation of solvents, which is particularly simple in its construction and which simultaneously allows effective and practically complete separation of the fluid's component parts.

In order to achieve solve this objective it is particularly suggested that a fine regulating valve be provided in the connection pipe between the evaporator and the separator, which is connected in front of the vacuum pump for regulation of the boiling pressure. While the invention is described below in connection with rotation evaporators, it is not limited thereto.

This fine regulating valve is initially opened at the start of evaporation, and work is undertaken at a high flow speed during this start phase, so that the solvent is rapidly brought up to the boiling point. In this way, the start of the process is rapidly reached. On reaching the boiling pressure, the regulating valve is closed, or only remains fractionally open to allow compensation for leakage losses. Here, the pump is operating close to its final pressure. The resulting very low flow speeds cause effective vapor condensation of the solvent, or the like, while still in the evaporator. This condensate is not contaminated and can thus be re-used without problem. Only a small quantity of solvent (or the like) condensate, which flowed through the connecting pipes and the pump, is collected in the secondary condenser, and can then be safely discarded. Hence, the apparatus according to the invention works at optimum flow speeds during all phases of the process.

One embodiment of the invention envisages that a ventilation valve, which remains closed during normal operation, is installed in the connection pipe between the evaporator and the fine regulating valve. This ventilation valve is preferably designed as a manually openable relief valve. This provides the possibility of increasing the vacuum in the connection pipe between the evaporator and the membrane pump, and hence terminating the evaporation process, practically as an emergency stop function.

BRIEF DESCRIPTION OF THE DRAWING

The foregoing summary, as well as the following detailed description of the invention, will be better understood when read in conjunction with the appended drawing. For the purpose of illustrating the invention, there are shown in the drawing embodiment(s) which are presently preferred. It should be understood, however, that the invention is not limited to the precise arrangements and instrumentalities shown. In the drawing.

The sole

DETAILED DESCRIPTION OF THE INVENTION

Figure 1:
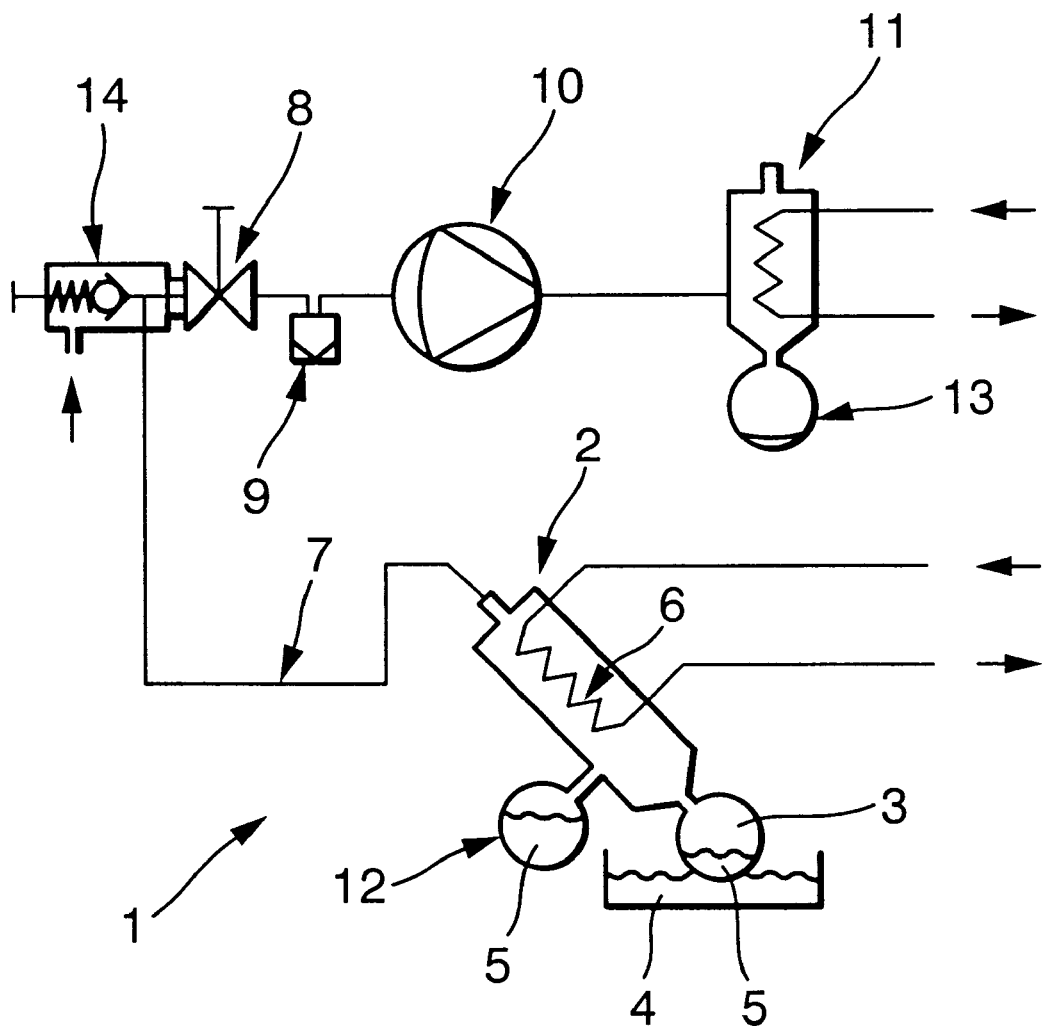
FIG. 1 shows a schematic design of an evaporation system according to the invention for the separation of a fluid mixture into its component parts, especially for the purposes of reclaiming solvents.

A system 1, shown in FIG. 1, has a rotation evaporator 2, whose glass flask 3 is rotatably disposed in a water bath 4. The liquid in the glass flask 3 also contains the solvent, or similar liquid component 5, which is to be evaporated. The rotational movement generates a thin liquid film on the glass, which increases the surface area and thereby also the performance of the evaporator. The number 6 designates the condenser of the rotation evaporator. A connection pipe 7 is connected to the rotation evaporator 2, which is connected via a fine regulating valve 8 and a solvent separator 9 to a vacuum pump 10, preferably designed as a membrane pump. A secondary condenser 11 is connected to the vacuum pump 10 at the pressure side.

The substance with the solvent which is to be evaporated, which is in the glass flask 3 of the rotation evaporator 2, has a temperature which approximately corresponds to the water bath temperature. In order to cause the solvent to evaporate, the vacuum pump 10 is switched on, generating an increasingly reduced pressure in the rotation evaporator 2 with the fine regulating valve 8 being open. Once the boiling pressure of the solvent is reached, it begins to evaporate, then it cools on the condenser 6, drips off and is collected in the round flask 12 of the evaporator. However, part of the vapor escapes from the rotation evaporator 2 into the connecting pipe 7 and is conveyed via the pump to the secondary condenser 11, where it condenses under atmospheric pressure and is collected in a secondary condensate container 13.

As is shown in FIG. 1, the connection pipe between the rotation evaporator 2 and the fine regulating valve 8 contains a ventilation valve 14 which is closed during normal operation. This ventilation valve 14 is preferably designed as a manually openable back pressure (check) valve. This provides the possibility of increasing the vacuum in the connection pipe 7 between the rotation evaporator 2 and the vacuum pump 10, and hence terminating the evaporation process, practically as an emergency stop function.

During the start phase, work can still be carried out at high flow speeds with the fine regulating valve 8 open, so that the solvent is rapidly brought to its boiling point. In this way, a rapid start to the process is achieved. Once the solvent begins to boil, fine regulation is undertaken with the help of the fine regulating valve 8, i.e. this fine regulating valve 8 is closed as far as is required to maintain the appropriate boiling pressure.

Here, the fine regulating valve 8 is only opened far enough to compensate for leaks occurring at the rotation evaporator 2, which increase the pressure in the evaporator. A very low and approximately constant flow speed sets in during the entire process, ensuring optimum condensation. Advantageously, the major portion of the condensate accumulates within the rotation evaporator 2, which means that this solvent can be re-used without problem. A very small amount of solvent accumulates in the secondary condenser 11, which in turn means lower disposal coats.

The useability and durability of solvents in the chemical laboratory is significantly increased as a result of reclamation of the solvent in the evaporator. This re-utilization means that the high costs of solvents can be significantly reduced. The vacuum system depicted here, which serves for the extraction of distillate, is especially intended for the reclamation of solvents but is also suitable for the separation of other fluid mixtures into their component parts. In doing this, the individual system parts—such as membrane pump, secondary condenser, separator and combination (ventilation and fine regulation) valve—form a compact system which can be mounted on a common base plate. In its operating state, the combination of ventilation and fine regulation provides a closed, hermetically-sealed regulating unit between the evaporator and the vacuum pump. This regulating unit is distinguished by its very low cost/benefit factor.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

I claim:

1. An evaporation system for separation of a fluid mixture into its component parts, comprising a vacuum pump connected to an evaporator, at least one separator connected to a suction side of the vacuum pump and at least one condenser connected to a pressure side of the vacuum pump and a fine regulating valve to regulate the boiling pressure installed in a connection pipe between the evaporator and the separator, said regulating valve being connected at said suction side of the vacuum pump.

2. The evaporation system according to claim 1, wherein a ventilation valve, which is closed in its normal operating state, is installed in said connection pipe between the evaporator and the fine regulating valve.

3. The evaporation system according to claim 2, wherein the ventilation valve comprises a manually openable relief valve.

4. The evaporation system according to claim 1, wherein the evaporator is a rotation evaporator.

5. The evaporation system according to claim 1, wherein the separation of the fluid mixture is for reclamation of solvents.

* * * * *